Dec. 27, 1966     C. A. LAUGHLIN     3,294,244
STORAGE DEVICE FOR CIRCULAR OBJECTS
Filed Feb. 8, 1965
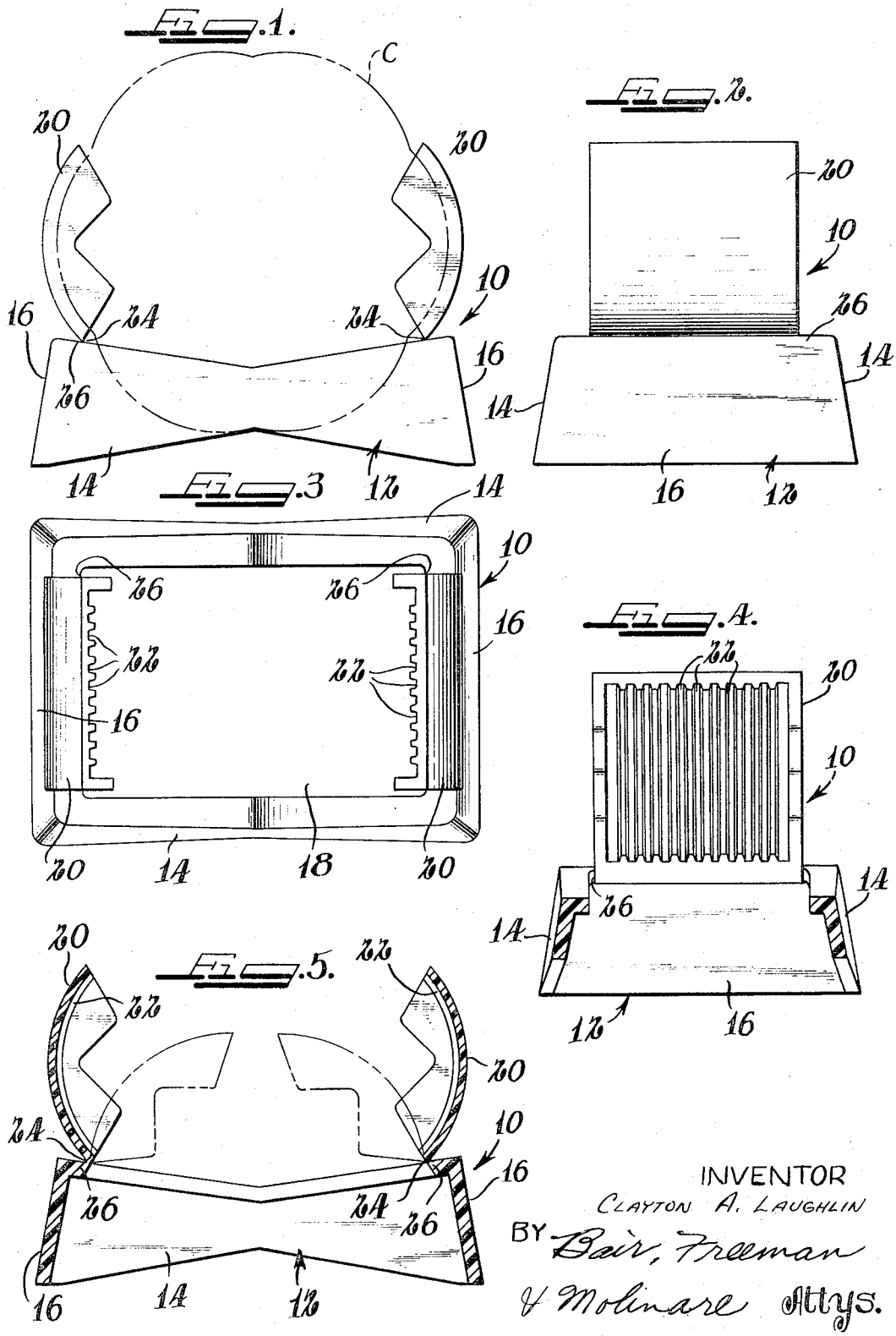
INVENTOR
CLAYTON A. LAUGHLIN
BY Bair, Freeman
& Molinare Attys.

3,294,244
STORAGE DEVICE FOR CIRCULAR OBJECTS
Clayton A. Laughlin, St. Paul, Minn., assignor to Flambeau Plastics Corporation, a corporation of Wisconsin
Filed Feb. 8, 1965, Ser. No. 431,046
5 Claims. (Cl. 211—41)

This invention relates to devices useful for storing circular objects and it particularly relates to integrally formed holders particularly useful for storing circular objects such as coasters.

It is an important object of this invention to provide an improved holder for storing substantially circular objects, such as coasters.

It is also an object of this invention to provide an improved holder for substantially flat and circular objects wherein the holder is of molded plastic construction.

It is a further object of this invention to provide an improved device for storing substantially circular coasters in a substantially upright position by securely positioning them between a pair of inwardly biased ears which are integrally formed with and hingedly connected to the base portion of the coaster holding device.

It is another object of this invention to provide an improved coaster holder which is characterized by its simplicity and economy of construction and manufacture.

Further purposes and objects of this invention will appear as the specification proceeds.

A particular embodiment of the present invention is illustrated in the accompanying drawings wherein:

FIGURE 1 is an end elevational view of my improved coaster holder construction wherein substantially circular coasters with scalloped edges are shown in phantom view within the holder;

FIGURE 2 is a side elevational view of the embodiment of FIGURE 1;

FIGURE 3 is a top plan view of the embodiment of FIGURE 1;

FIGURE 4 is a sectional view taken along the line 4—4 of FIGURE 3; and

FIGURE 5 is a sectional view taken along the line 5—5 of FIGURE 3.

Referring to the drawings, my improved storage device 10 for holding circular objects, such as coasters C therein, is provided with a base 12. The base 12 is of hollow construction and includes opposed end walls 14 joined by a pair of side walls 16. The base 12 includes a large central aperture 18 which partially receives coasters C therein so as to provide partial storage space therefor.

A pair of opposed, upstanding and arcuate ears 20 are hingedly connected to the upper side of the side walls 16 of the base 12 and at opposite sides of the aperture 18. The ears 20 receive coasters C therebetween so as to maintain them in the desired upright position.

Preferably, the ears are arcuate in shape so as to firmly receive the scalloped edges of the substantially circular coasters C therein. It is preferred that the innerfaces of each of the ears 20 be provided with a plurality of longitudinal grooves 22 for assisting in maintaining the appropriate spacing between the coasters C when stored.

It is an important feature of the applicants' invention that an integral hinge 24 be provided for pivotally or hingedly connecting each of the ears 20 to the upper side 26 of the walls 16. The integral hinges 24 also bias the ears 20 inwardly towards each other, as shown in phantom view in FIGURE 5, so that the coasters C are resiliently held in position during storage.

In order to provide my improved integrally formed coaster holder 10, it is constructed of molded plastic, and it is most desirably constructed of polypropylene or polyethelene in order to provide the desired characteristics to the integral hinge 24. It is preferred that polypropylene be used for the coaster holder 10 since polypropylene provides a high degree of flexibility of the hinges 24 while at the same time the thin strip of polypropylene which defines the hinge 24 permits free and repeated movement or pivoting of the ears 20 without any breakage thereof.

While in the foregoing there has been provided a detailed description of a particular embodiment of the present invention, it is to be understood that all equivalents obvious to those having skill in the art are to be included within the scope of the invention as claimed.

What I claim and desire to secure by Letters Patent is:

1. A unitary holder for storing circular objects, said holder comprising a base, a pair of upstanding ears for receiving said objects therebetween, and means integral with both said base and with said ears for hingedly and resiliently connecting said ears to said base.

2. The device of claim 1 wherein it is of molded polypropylene.

3. A holder particularly suitable for storing coasters therein, said holder comprising a base, a pair of opposed upstanding ears for receiving said coasters therebetween, a plurality of grooves along the innerfaces of each of said ears for receiving the edge portions of said coasters therein, and means integral with both said base and with said ears for hingedly connecting said ears to said base and for biasing said ears inwardly towards each other in order to firmly maintain said coasters in place therebetween.

4. The device of claim 3 wherein said base is of hollow construction and includes a central opening therein and adjacent said ears so as to provide access for said coasters to said hollow base whereby said coasters are partially held within said hollow base.

5. The device of claim 4 wherein it is of molded polypropylene construction.

References Cited by the Examiner

UNITED STATES PATENTS

| 1,569,737 | 1/1926 | Fording | 211—24 |
| 2,100,077 | 11/1937 | Harrison | 248—174 |
| 2,917,179 | 12/1959 | Casey et al. | 211—40 |

FOREIGN PATENTS 793,859   12/1935   France.

CLAUDE A. LE ROY, Primary Examiner.
K. J. WINGERT, Assistant Examiner.